United States Patent
Lahti

(10) Patent No.: US 7,014,717 B1
(45) Date of Patent: Mar. 21, 2006

(54) WIPER ASSEMBLY HAVING IMPACT ACTION

(76) Inventor: Mark S. Lahti, N14796 County Rd. 551, Wilson, MI (US) 49896

( * ) Notice: Subject to any disclaimer, the term of this patent is extended or adjusted under 35 U.S.C. 154(b) by 0 days.

(21) Appl. No.: 11/123,459

(22) Filed: May 7, 2005

Related U.S. Application Data

(60) Provisional application No. 60/570,437, filed on May 13, 2004.

(51) Int. Cl.
*B60S 1/34* (2006.01)
*B60S 1/32* (2006.01)
*B60S 1/44* (2006.01)

(52) U.S. Cl. ................. 134/42; 134/6; 15/250.19; 15/250.351; 15/250.352

(58) Field of Classification Search ............. 15/250.19, 15/250.351, 250.352, 250.202, 250.34; 134/6, 134/42
See application file for complete search history.

(56) References Cited

U.S. PATENT DOCUMENTS

| | | | | |
|---|---|---|---|---|
| 2,784,438 A | 3/1957 | Petersen | ...................... | 15/255 |
| 5,289,607 A * | 3/1994 | Journee | .................. | 15/250.203 |
| 5,487,204 A | 1/1996 | Nelson | ..................... | 15/250.19 |
| 6,129,093 A | 10/2000 | Kelly | ............................. | 134/6 |
| 6,471,784 B1 * | 10/2002 | Lahti | ........................... | 134/42 |
| 6,622,338 B1 * | 9/2003 | Chen et al. | .............. | 15/250.19 |
| 6,842,938 B1 * | 1/2005 | Genick et al. | ........... | 15/250.19 |
| 6,859,972 B1 * | 3/2005 | Couch | ..................... | 15/250.19 |

FOREIGN PATENT DOCUMENTS

| | | | |
|---|---|---|---|
| DE | 3731921 | * | 12/1988 |
| JP | 4-85150 | * | 3/1992 |

* cited by examiner

*Primary Examiner*—Gary K. Graham
(74) *Attorney, Agent, or Firm*—Donald J. Ersler

(57) ABSTRACT

A wiper assembly having impact action includes a wiper shaft cap, a first pivotal yoke, a second pivotal yoke, an actuation device and a wiper arm. The actuation device is formed in one end of the wiper arm. One end of the first pivotal yoke is pivotally attached to the wiper shaft cap. The other end of the first pivotal yoke is pivotally attached to one end of the second pivotal yoke. The other end of the second pivotal yoke is secured to an actuation end of the actuation device. In a second embodiment of a wiper assembly having impact action, the actuation device is formed in the wiper shaft cap. The actuation device in either embodiment is actuated to lift the wiper arm and drop thereof suddenly to remove sleet, ice or snow off a wiper blade.

12 Claims, 4 Drawing Sheets

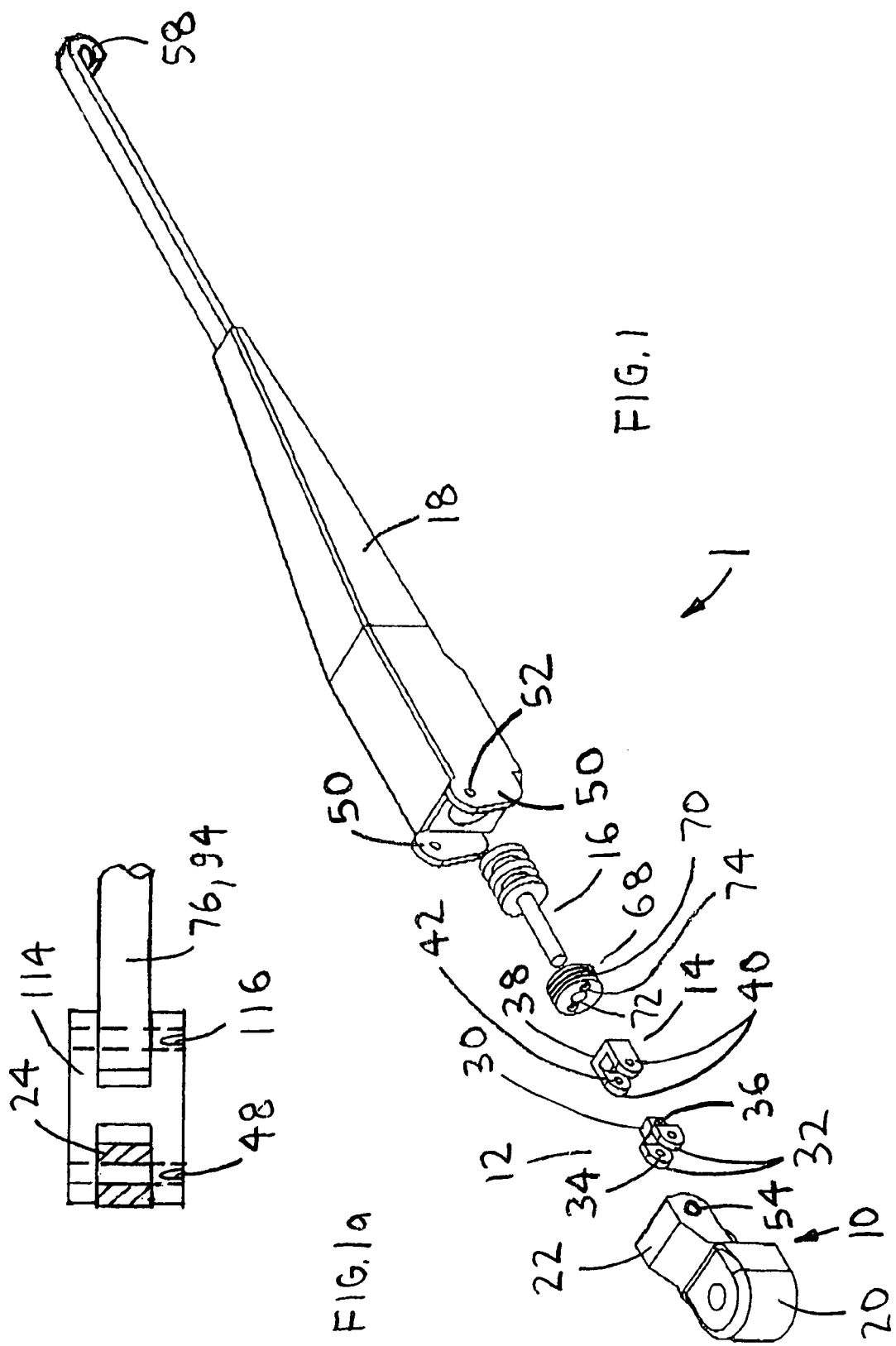

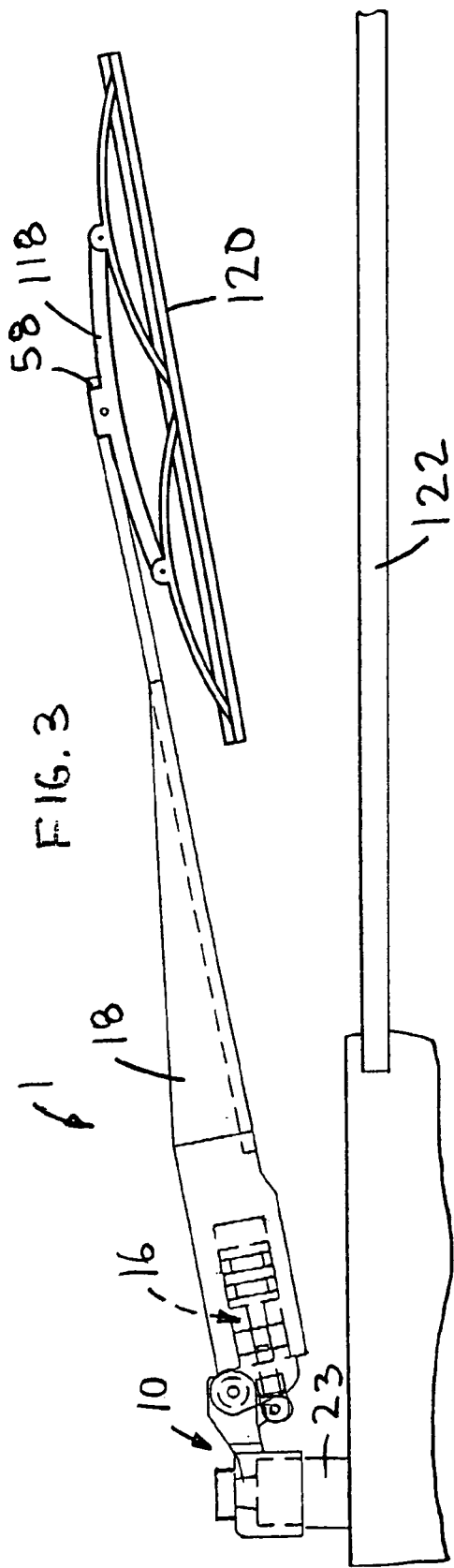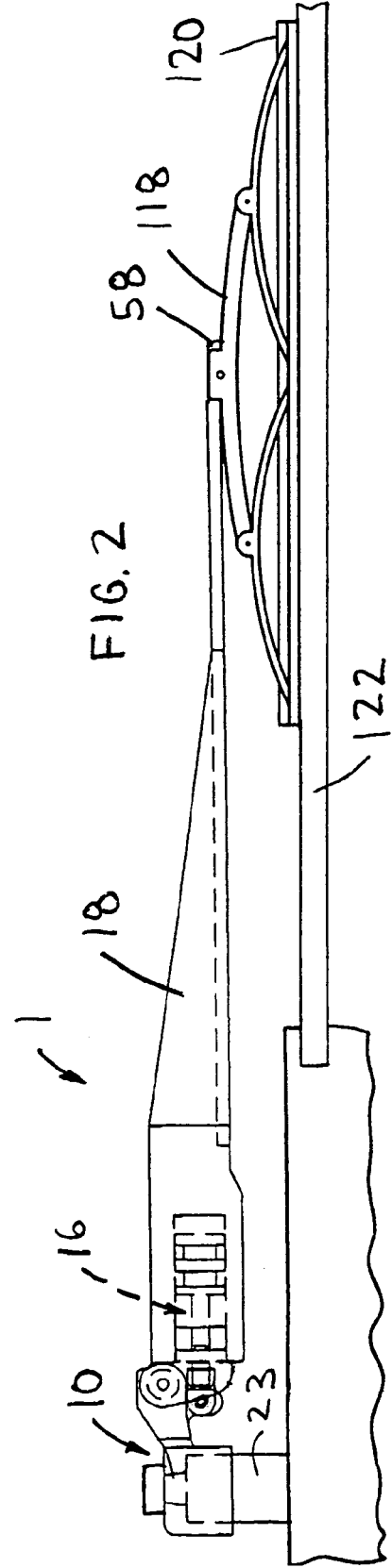

WIPER ASSEMBLY HAVING IMPACT ACTION

CROSS-REFERENCES TO RELATED APPLICATIONS

This is a utility patent application, taking priority from provisional patent application Ser. No. 60/570,437 filed on May 13, 2004.

BACKGROUND OF THE INVENTION

1. Field of the Invention

The present invention relates generally to wiper assemblies and more specifically to a wiper assembly having impact action, which expels sleet, ice, or snow from a wiper blade.

2. Discussion of the Prior Art

A problem frequently encountered by motorists is the collection of sleet, ice, or snow on a wiper blade. The removal of the sleet, ice, or snow frequently requires the driver to stop and knock thereof off the wiper blade by hand. Some big rig truck drivers will have to pull out a ladder and climb on the hood to clean the wiper blades. Some drivers will try to knock-off the sleet, ice, or snow while driving and other drivers will tolerate an obstructed windshield; either scenario creates a driving hazard.

U.S. Pat. No. 2,784,438 to Petersen discloses a windshield wiper arm operating mechanism. The Petersen patent includes a normally extended solenoid mounted on a top of a wiper shaft. An actuation end of the solenoid is attached to a wiper arm. When the solenoid is actuated; the wiper arm is lifted off the windshield. U.S. Pat. No. 5,487,204 to Nelson discloses a windshield wiper with deicer. The Nelson patent includes a normally extended solenoid pivotally attached to a top of a wiper shaft. An actuation end of the solenoid is pivotally attached to a wiper arm. When the solenoid is actuated, the wiper arm is lifted off the windshield. U.S. Pat. No. 6,129,093 to Kelly discloses a method of removing frozen material from a wiper. The Kelly patent includes a solenoid pivotally attached to a top of a wiper motor shaft. An actuation end of the solenoid is pivotally attached to an inside of a wiper arm. When the solenoid is actuated, the wiper arm is lifted off the windshield.

Accordingly, there is a clearly felt need in the art for a wiper assembly having impact action, which expels sleet, ice, or snow from a wiper blade to provide safe driving.

SUMMARY OF THE INVENTION

The present invention provides a wiper assembly having impact action that expels sleet, ice or snow off a wiper blade. The wiper assembly having impact action includes a wiper shaft cap, a first pivotal yoke, a second pivotal yoke, an actuation device and a wiper arm. The wiper shaft cap includes a cap body and a wiper arm pivotal base extending from a periphery of the cap body. A lift extension protrudes downward from a bottom of the wiper arm pivotal base. A shaft cavity is disposed in a bottom of the cap body. One end of the first pivotal yoke is pivotally attached to the lift extension and the other end is pivotally attached to one end of the second pivotal yoke.

A pair of arm ears extend from one end of the wiper arm and a wiper blade assembly holder is formed on the other end thereof. An actuation bore is formed in the one end of the wiper arm to receive a piston assembly of a pneumatic or hydraulic cylinder; or a coil of a solenoid. The piston assembly includes an actuation rod. A rod bore is formed in the other end of the second pivotal yoke. The rod bore is sized to receive the actuation rod or an armature actuation rod of a solenoid. The wiper shaft cap is attached to a wiper motor shaft with any suitable attachment method. The pair of arm ears are pivotally attached to the wiper arm pivotal base. The actuation device is actuated to lift the wiper arm off a windshield and drop thereof suddenly to remove sleet, ice, or snow off the wiper blade. In a second embodiment of a wiper assembly having impact action, the actuation bore is formed in the wiper shaft cap and the lift extension extends from the one end of the wiper arm.

Accordingly, it is an object of the present invention to provide a wiper assembly having impact action, which knocks sleet, ice or snow off a wiper blade.

Finally, it is another object of the present invention to provide a wiper assembly having impact action, which includes an actuation device that is retained in an end of a wiper arm or a wiper shaft cap.

These and additional objects, advantages, features and benefits of the present invention will become apparent from the following specification.

BRIEF DESCRIPTION OF THE DRAWINGS

FIG. 1 is an exploded perspective view of a wiper assembly having impact action in accordance with the present invention.

FIG. 1a is an enlarged top view of an H-pivotal yoke pivotally connected to a lift extension and an actuation rod of a wiper assembly having impact action in accordance with the present invention.

FIG. 2 is a side view of a wiper assembly having impact action in accordance with the present invention.

FIG. 3 is a side view of a wiper assembly having impact action with a wiper blade assembly lifted off a windshield in accordance with the present invention.

DETAILED DESCRIPTION OF THE PREFERRED EMBODIMENTS

Figure 4:
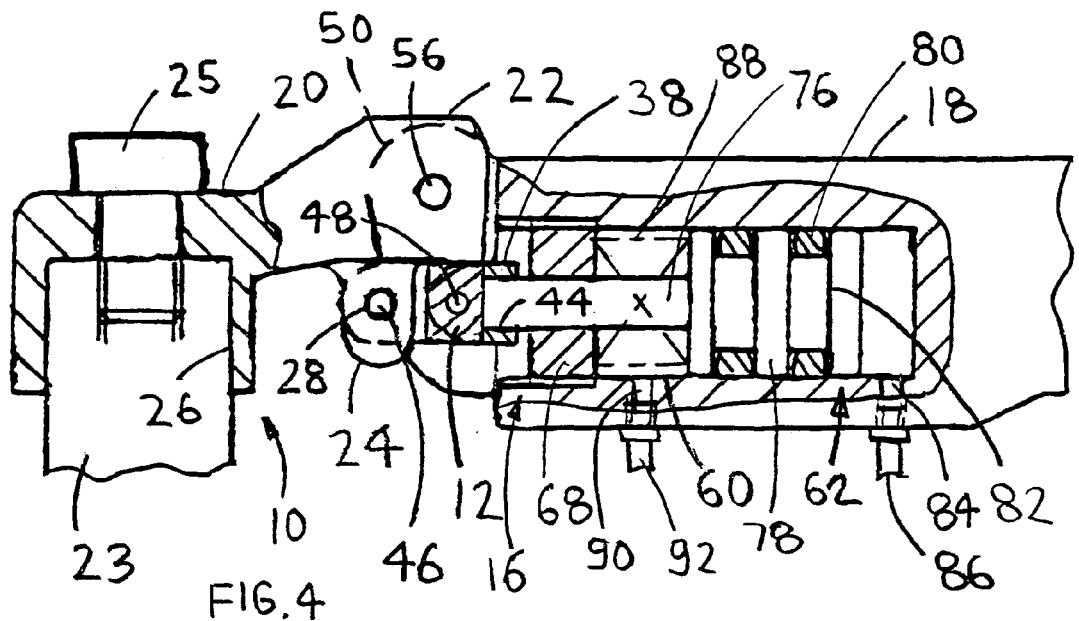
FIG. 4 is an enlarged cross sectional side view of a pneumatic/hydraulic cylinder contained in one end of the wiper arm of a wiper assembly having impact action in accordance with the present invention.

With reference now to the drawings, and particularly to FIG. 1, there is shown an exploded perspective view of a wiper assembly having impact action 1. With reference to FIG. 4, the wiper assembly having impact action 1 includes a wiper shaft cap 10, a first pivotal yoke 12, a second pivotal yoke 14, an actuation device 16 and a wiper arm 18. The wiper shaft cap 10 includes a cap body 20 and a wiper arm pivotal base 22 extending from a periphery of the cap body 20. A lift extension 24 protrudes downward from a bottom of the wiper arm pivotal base 22. A shaft cavity 26 is disposed in a bottom of the cap body 20. The shaft cavity 26 is sized to receive a wiper motor shaft 23. The cap body 20 is secured to the wiper motor shaft 23 with a fastener 25 or any other suitable method. However, other suitable drive shafts may also be used, besides the wiper motor shaft 23. A first pivot hole 28 is formed through the lift extension 24.

The first pivotal yoke 12 includes a first base 30 and a pair of first ears 32 that extend from the first base 30. A first yoke hole 34 is formed through the pair of first ears 32 and a first base hole 36 is formed through the first base 30. The second pivotal yoke 14 includes a second base 38 and a pair of second ears 40 that extend from the second base 38. A second yoke hole 42 is formed through the pair of second ears 40. A rod hole 44 is formed through the second base 38. A space between the pair of first ears 32 is sized to receive the lift extension 24. A lift pin 46 is inserted through the first pivot hole 28 and the first yoke hole 34 to pivotally retain the first pivotal yoke relative to the wiper shaft cap 10. A first pin 48 is inserted through the second yoke hole 42 and the base hole 36 to pivotally retain the first pivotal yoke 12 relative to the second pivotal yoke 14.

Figure 5:
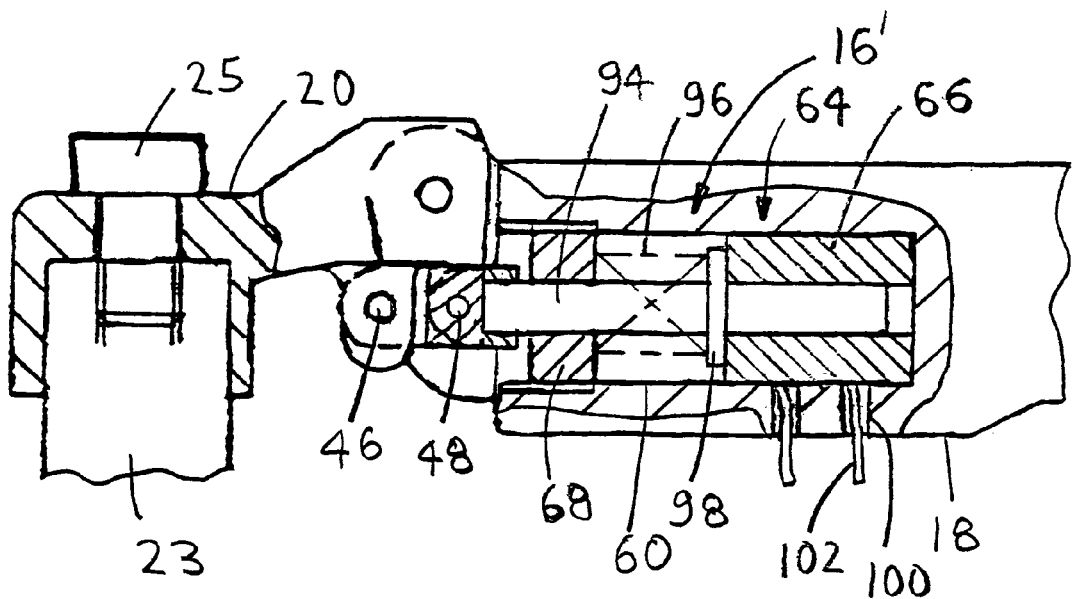
FIG. 5 is an enlarged cross sectional side view of a solenoid contained in one end of the wiper arm of a wiper assembly having impact action in accordance with the present invention.

A pair of arm ears 50 extend from one end of the wiper arm 18 An arm pivot hole 52 is formed through the pair of base ears 50. A base pivot hole 54 is formed through the wiper arm pivotal base 22. An arm pivot pin 56 is inserted through the arm pivot hole 52 and the base pivot hole 54 to pivotally retain the wiper arm 18 relative to the cap body 20. A wiper blade assembly holder 58 is formed on the other end of the wiper arm 18. However, other types of wiper blade assembly holders may also be used. With reference to FIG. 5, an actuation bore 60 is formed in the one end of the wiper arm 18 to receive a piston assembly 62 of a pneumatic or hydraulic cylinder; or a coil 66 of a solenoid 64. A bore plug 68 is retained in an end of the actuation bore 60. The bore plug 68 preferably includes a rod hole 72 and at least one rotation cavity 74. The bore plug 68 may be retained by threading a perimeter 70 of the bore plug 68 and threading an end of the actuation bore 60 to receive the perimeter 70. The bore plug 68 may also be retained in the actuation bore 60 with a snap ring, a dowel or any other suitable method.

The piston assembly 62 preferably includes an actuation rod 76, a piston 78 and at least one seal 80. The actuation rod 76 extends from an end of the piston 78. At least one seal groove 82 is formed in the piston 78 to receive the at least one seal 80. The actuation device formed with the piston assembly 62 may be single acting or dual acting. An actuation inlet 84 is formed adjacent a rear of the piston 78. When pressurized air or hydraulic fluid is supplied through an actuation hose 86, the actuation rod 76 is actuated out of the actuation bore 60. If the actuation device is single acting, a spring 88 is retained between the bore plug 68 and the piston 78. If the actuation device 16 is dual acting, a retraction inlet 90 is formed adjacent a front of the piston 78. The spring 88 is not used in a dual acting actuation device. When pressurized air or hydraulic fluid is supplied through a retraction hose 92, the actuation rod 76 is retracted into the actuation bore 60.

Figure 7:
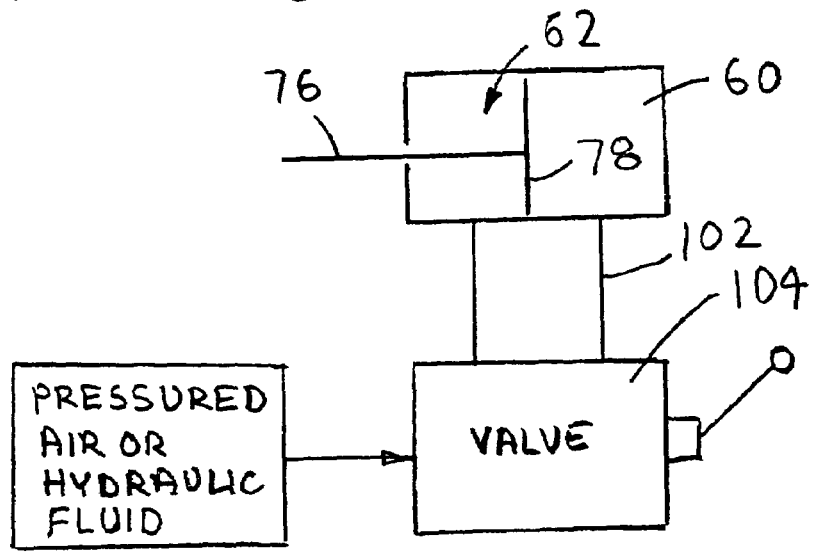
FIG. 7 is a schematic diagram of a pneumatic/hydraulic control system of a wiper assembly having impact action in accordance with the present invention.

The solenoid 64 includes the coil 66, an armature actuation rod 94 and a spring 96. A retention ring 98 radially extends outward from the armature actuation rod 76 at substantially a middle of the length thereof. A pair of wire holes 100 are preferably formed through the wiper arm 18 to the actuation bore 60 to receive a pair of wires 102. The pair of wires are used to electrically energize the coil 66. When the coil 66 is energized the armature actuation rod 94 will actuate out of the actuation bore 60. The armature actuation rod 94 will stay actuated, until electrical power to the coil 66 is terminated. The spring 96 will cause the armature actuation rod 94 to retract back into the actuation bore 60, after electrical power is terminated. The rod hole 72 of the threaded plug 68 is sized to slidably receive the actuation rod 76 or the armature actuation rod 94. The at least one rotation cavity 74 is preferably used to tighten the bore plug 68 (if threaded) against the actuation bore 60. With reference to FIG. 7, a valve 104 is used to control the flow of pressurized air or fluid to the actuation bore 60 to actuate the piston assembly 62.

Figure 6:
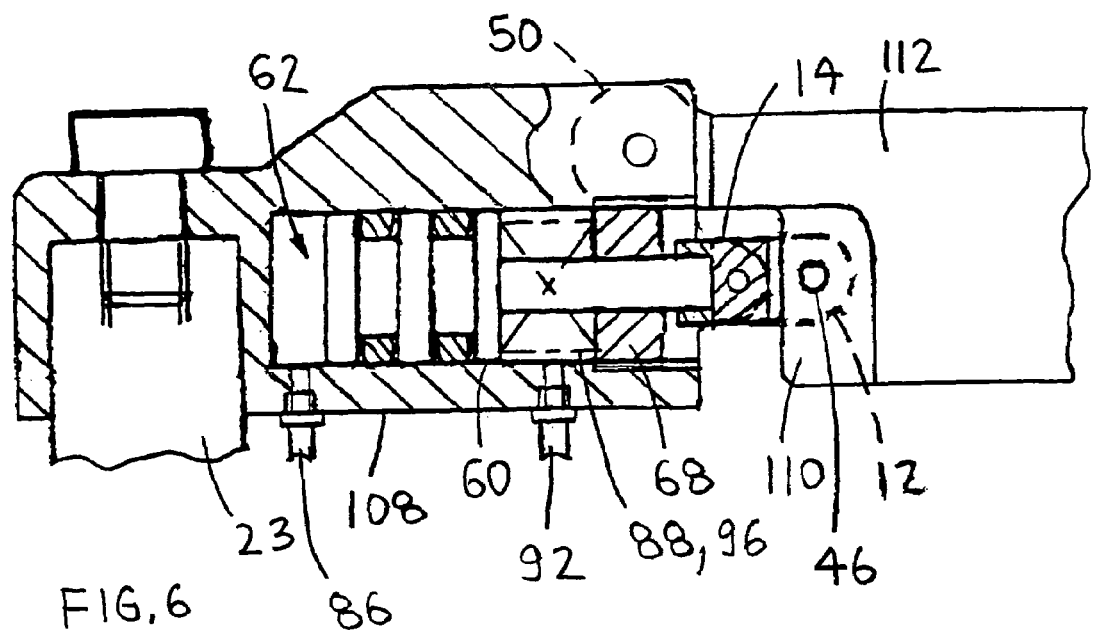
FIG. 6 is an enlarged cross sectional side view of a second embodiment of a wiper assembly having impact action with a pneumatic/hydraulic cylinder contained in a wiper shaft cap in accordance with the present invention.

With reference to FIG. 6, the actuation bore 60 is formed in an actuation wiper shaft cap 108. The piston assembly 62 is shown as being slidably retained in the actuation bore 60, but the solenoid 64 could also be retained in the actuation bore 60. The bore plug 68 is used to seal air pressure, hydraulic fluid pressure and/or retain a spring 88, 96. An arm lift extension 110 extends from one end of a wiper arm 112. A width of the arm lift extension 110 is sized to be received by the first pivotal yoke 12. The lift pin 46 is inserted through the first pivotal yoke 12 and the arm lift extension 110 to pivotal retain thereof.

With reference to FIG. 1a, an H-pivotal yoke 114 replaces the first and second pivotal yokes. One end of the H-pivotal yoke 114 is pivotally connected to the lift extension 24 of the wiper arm pivotal base 22 by inserting the first pin 48 therethrough. The other end of the H-pivotal yoke 114 is pivotally connected to the actuation rod 76 or the armature actuation rod 94 by inserting a rod pin 116 therethrough.

With reference to FIGS. 2–3, a wiper blade assembly 118 is retained by a wiper blade assembly holder 58. In FIG. 2, the wiper assembly having impact action 1 is shown in a normally wiping position with a wiper blade 120 of the wiper blade assembly 118 resting on a windshield 122. In FIG. 3, the actuation device 16 is actuated to lift the wiper blade 120 off the windshield 122 and drop thereof suddenly to remove sleet, ice or snow.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of expelling sleet, ice, or snow off a wiper blade, comprising the steps of:

attaching a wiper shaft cap to a drive shaft;

attaching pivotally one end of a wiper arm to said wiper shaft cap, a wiper blade extending from said wiper arm;

forming an actuation device in said one end of said wiper arm, said actuation device including an actuation rod;

attaching pivotally one end of a first pivotal yoke to said wiper shaft cap, pivotally attaching the other end of said first pivotal yoke to a second pivotal yoke, securing the other end of said second pivotal yoke to said actuation rod; and actuating said actuation device to lift the wiper blade off a windshield.

2. The method of expelling sleet, ice, or snow off a wiper blade of claim 1, further comprising the step of:

providing a solenoid for actuating an armature actuation rod for said actuation device.

3. The method of expelling sleet, ice, or snow off a wiper blade of claim 1, further comprising the step of:

providing a piston assembly and one of pressurized air and pressurized hydraulic fluid for said actuation device.

4. A method of expelling sleet, ice, or snow off a wiper blade, comprising the steps of:
- attaching a wiper shaft cap to a drive shaft;
- attaching pivotally one end of a wiper arm to said wiper shaft cap, a wiper blade extending from said wiper arm;
- forming an actuation device in said wiper shaft cap, said actuation device including an actuation rod;
- attaching pivotally one end of a first pivotal yoke to said one end of said wiper arm, pivotally attaching the other end of said first pivotal yoke to a second pivotal yoke, securing the other end of said second pivotal yoke to said actuation rod; and
- actuating said actuation device to lift the wiper blade off a windshield.

5. The method of expelling sleet, ice, or snow off a wiper blade of claim 4, further comprising the step of:
- providing a solenoid for actuating an armature actuation rod for said actuation device.

6. The method of expelling sleet, ice, or snow off a wiper blade of claim 4, further comprising the step of:
- providing a piston assembly and one of pressurized air and pressurized hydraulic fluid for said actuation device.

7. A method of expelling sleet, ice, or snow off a wiper blade, comprising the steps of:
- attaching a wiper shaft cap to a drive shaft;
- attaching pivotally one end of a wiper arm to said wiper shaft cap, a wiper blade extending from said wiper arm;
- forming an actuation device in said one end of said wiper arm, said actuation device including an actuation rod;
- attaching pivotally one end of a H-pivotal yoke to said wiper shaft cap, pivotally attaching the other end of said H-pivotal yoke to said actuation rod; and
- actuating said actuation device to lift the wiper blade off a windshield.

8. The method of expelling sleet, ice, or snow off a wiper blade of claim 7, further comprising the step of:
- providing a solenoid for actuating an armature actuation rod for said actuation device.

9. The method of expelling sleet, ice, or snow off a wiper blade of claim 7, further comprising the step of:
- providing a piston assembly and one of pressurized air and pressurized hydraulic fluid for said actuation device.

10. A method of expelling sleet, ice, or snow off a wiper blade, comprising the steps of:
- attaching a wiper shaft cap to a drive shaft;
- attaching pivotally one end of a wiper arm to said wiper shaft cap, a wiper blade extending from said wiper arm;
- forming an actuation device in said wiper shaft cap, said actuation device including an actuation rod;
- attaching pivotally one end of a H-pivotal yoke to said wiper arm, pivotally attaching the other end of said H-pivotal yoke to said actuation rod; and
- actuating said actuation device to lift the wiper blade off a windshield.

11. The method of expelling sleet, ice, or snow off a wiper blade of claim 10, further comprising the step of:
- providing a solenoid for actuating an armature actuation rod for said actuation device.

12. The method of expelling sleet, ice, or snow off a wiper blade of claim 10, further comprising the step of:
- providing a piston assembly and one of pressurized air and pressurized hydraulic fluid for said actuation device.

\* \* \* \* \*